June 28, 1966     E. P. WALKER     3,258,648
APPARATUS RESPONSIVE TO OVERLOAD AND UNBALANCE IN
A THREE PHASE ELECTRICAL SUPPLY
Filed March 14, 1962     2 Sheets-Sheet 1

Inventor:
Edward Piper Walker
By Stevens, Davis, Miller and Mosher
Attorney

June 28, 1966   E. P. WALKER   3,258,648
APPARATUS RESPONSIVE TO OVERLOAD AND UNBALANCE IN
A THREE PHASE ELECTRICAL SUPPLY
Filed March 14, 1962                                2 Sheets-Sheet 2

Inventor:
Edward Piper Walker
By:
Stevens, Davis, Miller & Mosher
Attorneys

3,258,648
APPARATUS RESPONSIVE TO OVERLOAD AND UNBALANCE IN A THREE PHASE ELECTRICAL SUPPLY
Edward Piper Walker, Stafford, England, assignor to The English Electric Company Limited, London, England, a British company
Filed Mar. 14, 1962, Ser. No. 179,753
Claims priority, application Great Britain, Aug. 23, 1961, 30,343/61; Dec. 30, 1961, 46,803/61
13 Claims. (Cl. 317—47)

This invention relates to control or warning apparatus comprising means responsive to overload or unbalance or both overload and unbalance in a polyphase electrical supply, in particular a three-phase supply.

According to one aspect, the present invention provides control or warning apparatus comprising means for deriving, from a polyphase electrical supply, positive or negative or both positive and negative phase sequence components of current, means for generating heat in dependence on the derived current components, and a control or warning device responsive to the heat so generated.

According to another aspect, the present invention provides control or warning apparatus comprising an electrical circuit for connection to a three-phase supply and operative to provide a first current output proportional to the positive phase sequence components of the supply and a second current output proportional to the negative phase sequence components of the supply, first and second means for generating heat in dependence on said first and second current outputs respectively and means responsive to the heat so generated for operating a control or warning device.

The invention will now be particularly described, by way of example, with reference to the accompanying drawings in which.

Figure 1:
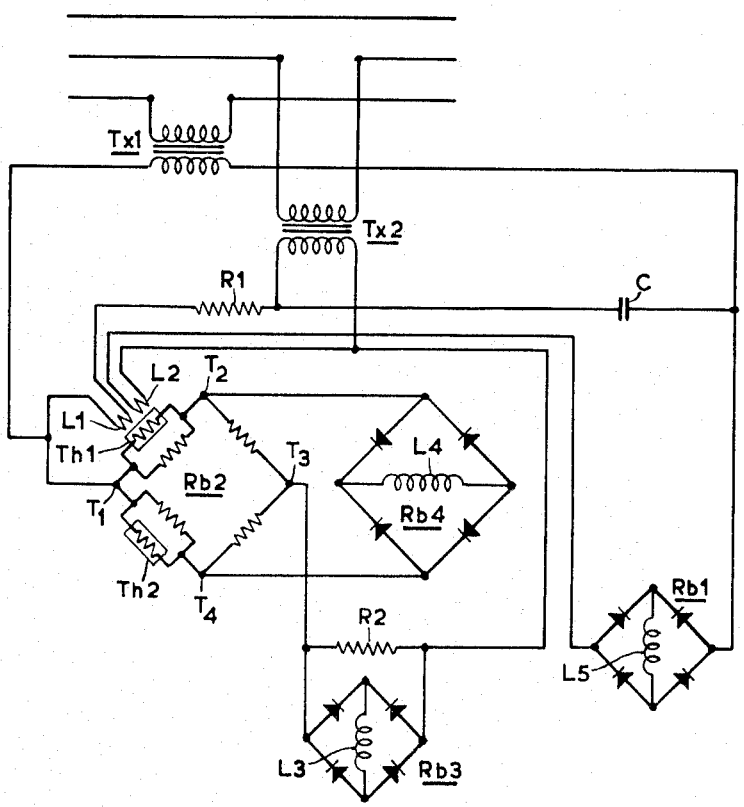
FIG. 1 is a diagram of a phase sequence analyser circuit to which heating coils are connected and including a thermistor responsive to the heat output of the coils for controlling a supply protection device.
Figure 2:
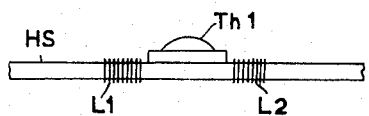
FIG. 2 shows a thermistor mounted on a heat sink on which said coils are wound.

In the embodiment shown in FIGS. 1 and 2, the circuit of the apparatus comprises first and second transformers $Tx1$ and $Tx2$ connected in different phases of the three phase supply. Connected from a first end of the secondary winding of transformer $Tx1$ is a positive phase sequence heater coil L1, a resistor R1 and a capacitor C, the latter being connected to the opposite or second side of the secondary of transformer $Tx1$. The secondary of transformer $Tx2$ is connected at one end to a tapping between the resistor R1 and capacitor C, and the second or opposite end of the secondary is connected through a negative sequence heater coil L2 and a rectifier bridge $Rb1$ to the second side of the secondary of transformer $Tx1$.

Connected in series between the first side of the secondary of transformer $Tx1$ and the second side of the secondary of transformer $Tx2$, are a resistance bridge $Rb2$, connected by its opposite terminals $T_1$ and $T_3$, and a rectifier bridge $Rb3$. Connected across the opposite pair of terminals $T_2$ and $T_4$ of the resistance bridge $Rb2$ is another rectifier bridge $Rb4$.

In the arm $T_1$–$T_2$ of the resistance bridge $Rb2$ is a thermistor $Th1$ which is mounted on a heat sink HS on which are wound the heater coils L1 and L2. In the arm $T_1$–$T_4$ of the resistance bridge $Rb2$ is an ambient temperature compensating thermistor $Th2$, each thermistor being shunted by a resistor to make the resistance-temperature characteristic of the combination linear over a given temperature range.

The rectifier bridge $Rb4$ connected between the terminals $T_2$ and $T_4$ of the resistance bridge $Rb2$ has connected between its other opposite pair of terminals an operating coil L4 of a polarized relay. This relay is operable to actuate a supply protection device e.g. a circuit breaker. Connected across a second opposite pair of terminals of rectifier bridge $Rb3$ is a coil L3 operable as a restraint coil on the same polarized relay; and connected across the second pair of opposite terminals of rectifier bridge $Rb1$ is the operating coil L5 of a second relay.

By reason of the resistance-capacitance network included in the circuit described above, the positive and negative phase sequence components of current are caused to flow in the heating coils L1 and L2 respectively which, being wound on the heat sink HS shown in FIGURE 2, cause the thermistor $Th1$ to be heated, but with a time delay $t$. The resistance bridge $Rb2$, being connected in part of the sequence network, will have a resistance value adjusted to maintain correct operation of this network.

The operating coil L4 of the polarized relay, being connected in the rectifier bridge $Rb4$ which itself is connected across the resistance bridge $Rb2$, will receive current on unbalance of the bridge $Rb2$, and will operate the relay after the time delay $t$. The value of $t$ is given by the expression $$[(I_1-I_0)^2+H(I_2-I_0')^2]t=K$$

In this expression—
K is a constant dependent on the thermal capacity of the heat sink;
$I_1$ represents the positive phase sequence components of current;
$I_2$ represents the negative phase sequence components of current;
$I_0$ and $I_0'$ are the currents which, when flowing through the respective heating coils will heat the latter just sufficiently to actuate the supply protection device assuming that no current is flowing in the complementary heating coil; and
H is a constant representative of the amount of negative in relation to positive phase sequence current which a motor can carry. The commonly accepted value for H is 1.5, but this figure is of course arbitrary. It will be evident that this expression is valid only for values of $I_1$ and $I_2$ greater than $I_0$ and $I_0'$ respectively.

To compensate for variation of bridge current with load, the polarized relay is provided with the restraint coil or bias winding L3 arranged to restrain the relay as the load current increases. The rectifier bridge is so connected that the restraining influence of the coil L3 becomes effective only at currents greater than full load. This effect is achieved by making the shunt resistance R2 across the bridge $Rb3$ of such a value that the voltage drop across it is in the region of the toe voltage of the rectifier bridge at full load current. By "toe voltage" is meant that voltage at which the forward resistance of the rectifier bridge changes from a comparatively high value to a low value. Hence the current in the restraint coil L3 is limited by this high resistance of the rectifier bridge until full load current is reached.

The second relay, of which L5 is the operating coil, constitutes an instantaneous negative sequence relay provided to give instantaneous clearance of all faults, except balanced three phase faults, above a particular setting which can be varied.

Figure 3:
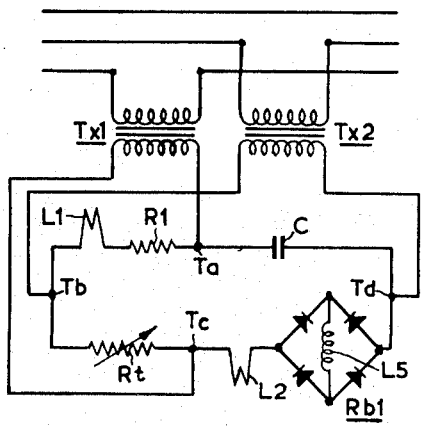
FIG. 3 shows a modification of the circuit of FIG. 1.
Figure 4:
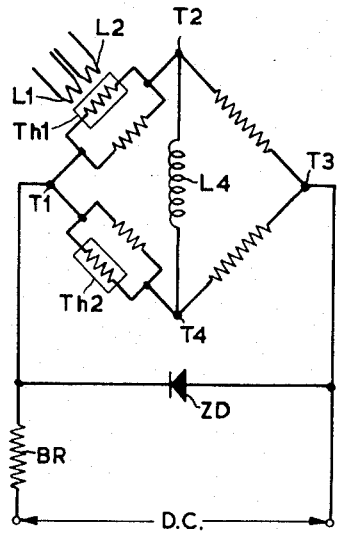
FIG. 4 shows the heating coils of FIG. 3 connected in a thermistor bridge which is energized by a separate electric supply.

The second embodiment shown in FIGS. 3 and 4 is a modification of the first embodiment.

As shown in FIG. 3, the circuit comprises first and second transformers $Tx1$ and $Tx2$ connected in different phases of the three phase supply. The secondary windings of these transformers are connected respectively across the opposite terminals $Ta$, $Tc$ and $Tb$, $Td$ of a bridge network. The arm $Ta-Tb$ of the bridge contains a positive phase sequence heater coil $L1$ and a resistor $R1$, the arm $Tb-Tc$ contains a variable resistor $Rt$, the arm $Tc-Td$ contains a negative phase sequence heater coil $L2$ and a rectifier bridge $Rb1$, and the arm $Td-Ta$ contains a capacitor C. The actuating winding $L5$ of an instantaneous negative phase sequence relay is connected across the second pair of opposite terminals of the rectifier bridge $Rb1$.

As indicated in FIG. 4 the positive and negative phase sequence heating coils $L1$ and $L2$ are wound on a thermistor $Th1$ which is connected in a thermistor bridge. This bridge has terminals $T1$, $T2$, $T3$ and $T4$. The thermistor $Th1$ is connected in the arm $T1-T2$ of the bridge and in the arm $T1-T4$ of the bridge is an ambient temperature compensating thermistor $Th2$. The remaining arms of the bridge contain balancing resistors. Each of the thermistors is shunted by a resistor for making the resistance-temperature characteristic of the combination linear over a given temperature range. An auxiliary D.C. supply is connected across the terminals $T1$ and $T3$ of the bridge through a ballast resistor BR, and a Zener diode ZD is connected to shunt the bridge and stabilize the supply.

Connected between the terminals $T2$ and $T4$ of the bridge is the operating coil $L4$ of a polarized relay which is operable to actuate a supply protection device e.g. a circuit breaker.

The form of circuit described in FIG. 3 will cause positive phase sequence current to flow in the coil $L1$, during operation of the three phase supply and when unbalance of this supply occurs, negative phase sequence current will flow in the coil $L2$.

These currents will cause heating of the thermistor $Th1$ which will result in unbalance of the thermistor bridge shown in FIG. 4. The setting of this bridge is such that when both currents flowing in the coils $L1$ and $L2$ reach predetermined values, the unbalance of the bridge will provide a sufficient current in the coil $L4$ to actuate the relay. However in the absence of any unbalance of the three phase supply, overload of the supply will increase the positive phase sequence current flowing in the coil $L1$ which again will unbalance the bridge and cause current to flow in the coil $L4$. When this unbalance current reaches a predetermined value, the relay will likewise operate to actuate the supply protection device.

Figure 5:
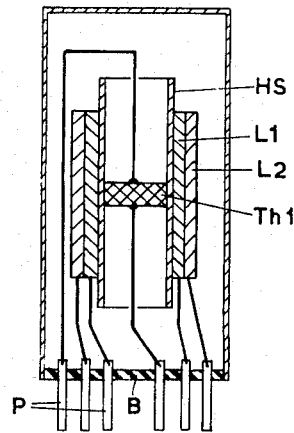
FIG. 5 shows a thermistor unit for use in the embodiment of FIGS. 3 and 4.

The construction of the thermistor $Th1$ and its associated heating coils $L1$ and $L2$ is shown in FIG. 5. As shown, the thermistor $Th1$ is located in a cylindrical heat sink HS around the outside of which the positive and negative phase sequence heating coils $L1$ and $L2$ is wound one on top of the other. This combination is encapsulated in resin and mounted on a base B which contains pins P connected by conducting leads to the components $Th1$, $L1$ and $L2$, the pins being suitable for insertion into a corresponding socket.

As in the first embodiment, the heat sink provides a time delay to avoid operation of the relay in response to transients, and this time delay is expressed in the same way as given above in connection with the first embodiment.

In order to allow positive and negative phase sequence power of sufficient value to be drawn from the three phase supply, it is arranged that the resistive loads in the circuit of FIG. 1 are $1\sqrt{3}$ times the ohmic value of the capacitive reactance. This arrangement provides the required 60° phase shift. The loads connected in the positive and negative phase sequence outputs must therefore be resistive and summate to the correct value to produce the required 60° phase angle.

Since overload in all three phases of the supply will not produce negative phase sequence current components in the apparatus, although it will increase the positive phase sequence current components and therefore operate the relay in the normal way with a time delay, instantaneous protection against such three phase over-load above a prearranged value may be obtained by connecting the winding of an instantaneous over-current protection relay in the primary winding of either of the transformers $Tx1$ and $Tx2$, or in the third line of the three-phase supply.

I claim:
1. Control or warning apparatus comprising an electrical circuit for analysing a three-phase supply into its positive and negative phase sequence current components, first means for generating heat in response to said positive phase sequence components, second means for generating heat in response to said negative phase sequence components, a control or warning device, and a heat-sensitive detector whose electrical characteristics vary in dependence on the heat to which it is submitted for operating said control or warning device in response to a predetermined total heat output from said first and second means.

2. Control or warning apparatus comprising an electrical circuit for connection to a three-phase supply and operative to provide a first current output proportional to the positive phase sequence components of the supply and a second current output proportional to the negative phase sequence components of the supply, first and second means for generating heat in dependence on said first and second current outputs, respectively, heat-sensitive means whose electrical characteristics vary in dependence on the heat to which it is submitted responsive to the heat so generated, and a control or warning device operable by said heat-sensitive means in response to a predetermined magnitude of heat received thereby from both said first and second means.

3. Apparatus according to claim 2, wherein each said heat generating means comprises a heating coil and the heat-sensitive means comprises a device whose impedance is a function of temperature.

4. Apparatus according to claim 3, wherein said impedance device is a thermistor.

5. Control or warning apparatus comprising an electrical circuit for connection to a three-phase supply and operative to provide a first current output proportional to the positive phase sequence components of the supply and a second current output proportional to the negative phase sequence components of the supply, first and second means for generating heat in dependence on said first and second current outputs respectively, and a thermistor arranged to be heated by both said first and second heat generating means, and effective to operate a control or warning device.

6. Apparatus according to claim 5, having a heat sink in juxtaposition to said thermistor.

7. Apparatus according to claim 5, wherein said thermistor is connected in one arm of a resistance bridge, an ambient temperature-compensating thermistor being connected in an adjacent arm of the bridge, the operating coil of a relay being connected in said bridge to receive current upon unbalance of the bridge, said relay being operative in response to a predetermined unbalanced current to actuate said control or warning device.

8. Apparatus according to claim 7, having an electric supply connected to energise the resistance bridge, said electric supply being independent of said three-phase supply.

9. Apparatus according to claim 5, having a relay responsive to instantaneous values of the negative sequence components of current above a predetermined value.

10. Control or warning apparatus comprising an electrical circuit for connection to a three-phase supply and operative to provide a first current output proportional to the positive phase sequence components of the supply and a second current output proportional to the negative phase sequence components of the supply, first and second means for generating heat in dependence on said first and second current outputs respectively, and a thermistor arranged to be heated by both said first and second heat generating means, and effective to operate a control or warning device, wherein the electrical circuit comprises an impedance bridge having four arms, one phase of the supply being connected across one opposite pair of terminals of the bridge, another phase of the supply being connected across the second opposite pair of terminals of the bridge, the heating means being connected in two opposite arms of the bridge and a capacitor being connected in a third arm of the bridge.

11. Apparatus according to claim 10, wherein said thermistor is located in the fourth arm of the bridge.

12. Apparatus according to claim 11, wherein said thermistor is located in one arm of a resistance bridge, an ambient temperature-compensating thermistor being located in an adjacent arm of the bridge, an operating coil of a relay for controlling the control or warning device being connected to respond to unbalance in said resistance bridge.

13. Apparatus according to claim 12, having a restraint coil associated with said relay and connected to respond to current in that arm of the bridge which contains said thermistor.

References Cited by the Examiner
UNITED STATES PATENTS

| | | | |
|---|---|---|---|
| 1,535,589 | 4/1925 | Evans | 317—47 X |
| 1,726,928 | 9/1929 | Sleeper et al. | 317—47 |
| 1,939,046 | 12/1933 | Fortesque et al. | 317—47 |
| 2,377,506 | 6/1945 | McWhirter et al. | 317—41.1 |

SAMUEL BERNSTEIN, *Primary Examiner.*

J. D. TRAMMELL, *Assistant Examiner.*